March 1, 1949. G. W. KREBS 2,463,397
TOY
Filed April 1, 1947
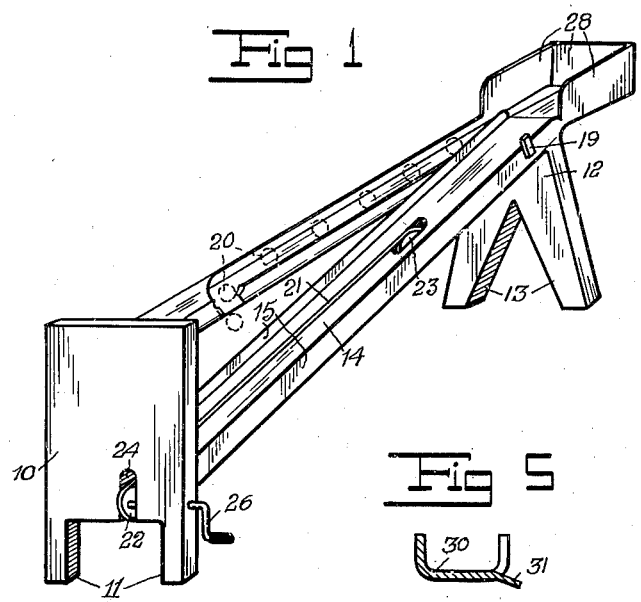
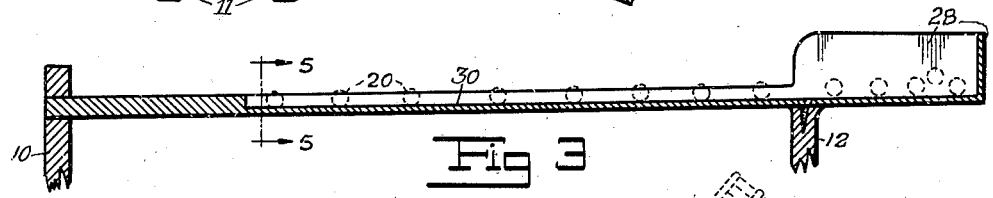
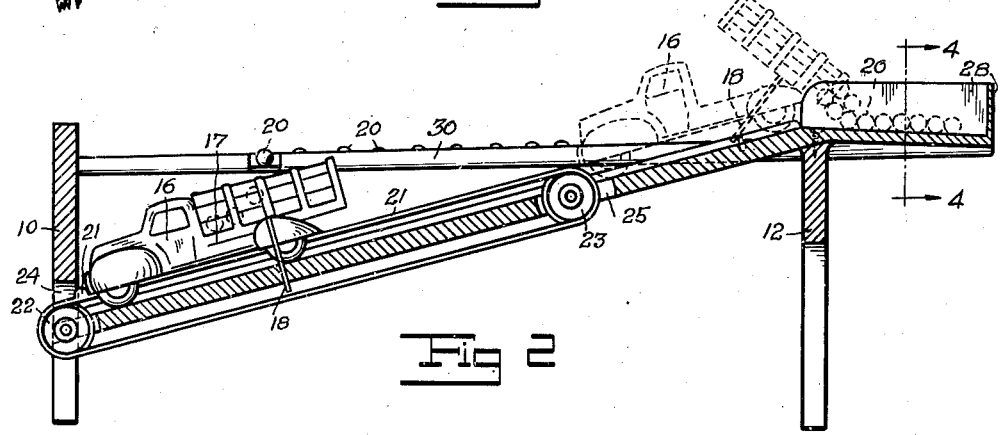
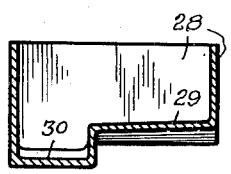
INVENTOR.
GEO. W. KREBS
BY
*Munn, Liddy & Glaccum*
Attorneys Patented Mar. 1, 1949

2,463,397

UNITED STATES PATENT OFFICE 2,463,397

TOY

George Walker Krebs, Anacortes, Wash.

Application April 1, 1947, Serial No. 738,591

4 Claims. (Cl. 46—40)

This invention relates to new and useful improvements in toys, and has particular reference to toys in which a toy dump truck or similar vehicle is employed.

An object of the invention is to provide a simple, efficient, durable and attractive apparatus which can be operated to entertain by merely turning a handle in order to effect the otherwise automatic occurrence of a series of operations involving the dumping and sequential loading of a truck.

A further object is to provide a device in which the parts are simple and economical to construct and repair.

A still further object is to provide a device in which the operations of loading and unloading of a toy truck are achieved in as realistic manner as possible.

Yet another object is to provide an apparatus which will operate automatically with a minimum of knowledge on the part of the operator whereby even small children may operate it as effectively as older children.

Further and more specific objects, features, and advantages will more clearly appear from a consideration of the detailed specification hereinafter set forth especially when taken in connection with the accompanying drawings which illustrate a present preferred form which the invention may assume and which forms part of the specification.

In brief and general terms, the invention concerns a frame on which is an inclined track up and down which moves a toy truck containing material to be dumped therefrom, which material may be marbles, sand, water or any other material which is adaptable to move by gravity. The truck is pushed up the track by means engaging it loosely and is provided with a dump body and a dump element which engages a trip element on a predetermined portion of the track to dump the contents into a receiving chamber connected to a return chute so that the material will move or run down the chute to a return point. The pushing means for the truck is preferably disposed on an endless belt and engages the truck on the upward movement of the truck along the track but automatically becomes disengaged therefrom when the truck reaches a predetermined part of its upward movement and this is after the instant that the truck material has been dumped. Thereafter, the truck runs down the track by gravity to the starting point and the material dumped has run down the chute to a point over the dump body and the chute is provided with a discharge passage permitting the material to drop by gravity into the dump truck body again after which the operation may be repeated.

Preferably, the driving means for the truck is an endless belt having its upper run above the bottom of the track, and on the belt is disposed an element in the form of a projection, protuberance, knob or the like which as the run moves upward engages a part of the truck to move it along with the belt. The belt moves over and around two spaced pulleys on the frame and as it reaches the upper pulley the projection is disengaged from the truck body as it passes around the upper pulley. When it passes around and over the lower pulley the projection again encounters the truck body which has by gravity returned to the starting position and the operation is repeated. This movement of the belt is effected merely by turning a handle attached to the shaft of one of the pulleys.

It will be seen, therefore, that we have a frame, an inclined track along which a truck body moves, means for moving the truck up the track, means for dumping the truck when the truck has arrived at a definite point on the track, and means for releasing the moving means from the truck when the truck has been dumped. We also have a return chute connected to a chamber into which material is dumped, said chute sloping downward toward the starting position and above the body at that point and means in the chute whereby the material is automatically dumped into the body as the truck is disposed in its starting position.

The present preferred form which the invention may assume is illustrated in the drawings, of which Fig. 1 is a perspective view of the apparatus;

Fig. 2 is a vertical longitudinal section therethrough;

Fig. 3 is a vertical longitudinal section through the return chute;

Fig. 4 is a vertical transverse section taken on the line 4—4 of Fig. 2; and

Fig. 5 is a vertical transverse section taken on the line 5—5 of Fig. 3.

Referring now merely to the specific structure of the illustrated preferred form, it will be seen that the device comprises a vertical end frame pedestal 10 with legs 11 and a spaced vertical end frame pedestal 12 with legs 13. Disposed between these end frames is an inclined track element 14 which slopes upwardly from frame 10 to frame 12. This track has side walls 15 and on it a toy dump truck 16 is adapted to move. The dump body 17 of the truck is provided with a dependent trip arm 18 which, when the truck has moved up the track a certain distance, engages a trip element 19 disposed at the upper end of a side wall 15 to dump the contents of the truck which, in one instance, may be marbles 20.

The truck 16 is driven or impelled up the track 14 by suitable means which, in the form shown, is an endless belt or cable 21 running over spaced pulleys 22 and 23 disposed in suitable slots 24 and 25 of the frame and track. The belt is moved by means of a handle 26 connected to the shaft of the lower pulley 23. The belt or cable is provided with an element which engages the front of the truck and is shown in the form of a knob or protuberance 27 (Fig. 2), which, as the belt is turned so that the upper run of it moves up the track, bears against an adjacent part of the truck to push it up the track until the knob 27 passes over and around the pulley 23 whereupon the knob passes from engagement with the body and the truck is then free to run down the track by gravity back to its starting position.

However, just before the knob 27 leaves the truck body the trip arm 18 has met the trip element 19 and dumped the truck so that the contents of the truck or the marbles, in this instance, are dumped, and they pass onto a receiving chamber which has three side walls 28 and is open to the track. The bottom of the chamber is numbered 29 and slopes down and to the left as shown in Fig. 4, and downward to the right as shown in Fig. 2, so that when the marbles are dumped they will by gravity move and drop into the upper end of a return channel or chute 30, the upper end of which runs alongside the lower side of the chamber bottom 29 as shown.

The return chute is U-shaped as shown in Fig. 5 and slopes slightly downward from the receiving chamber to a point over the starting position of the truck body so that as the marbles are received into the chute they will pass back to the position mentioned by gravity. At this end of the chute, the side wall of it is cut away by forming a separate bent down lip 31 (Fig. 5) over which the marbles spill to drop into the truck body which has by this time rolled back to starting position.

As the operator continues to turn the handle 26, the knob 27 will pass over and around the pulley and again encounter the truck body to repeat the operation. After the truck body has been supplied with the marbles, it is merely necessary for the operator to turn the handle and continue so to do in order for this series of operations above described to automatically repeat themselves indefinitely.

While the invention has been described in detail with respect to a present preferred form which the invention may assume, it is not to be limited to such details and form since many changes and modifications may be made in the invention without departing from the spirit and scope of the invention in its broadest aspects. Hence, it is desired to cover any and all forms and modifications of the invention which may come within the language or scope of any one or more of the appended claims.

What I claim as my invention is:

1. In a device of the class described, an inclined track, a dump truck movable along the track, means for moving the truck up the track, means for releasing the truck from the moving means when the truck has reached a predetermined point on the track, means for dumping the truck just before the truck is released, a receiver for material dumped from the truck, a chute sloping down from the receiver to a point over the starting position of the truck and adapted to discharge the material into the truck as the material reaches the lower end of the chute.

2. In a device of the class described, an inclined track, a dump truck movable along said track, an endless driving element, means on said element to engage the truck and move it up the track, means for disengaging the engaging means when the truck has reached a predetermined point on the track, means for dumping the truck just before the truck is released, a receiver for material dumped from the truck, a chute sloping down from the receiver to a point over the starting position of the truck, and adapted to discharge the material into the truck as the material reaches the lower end of the chute.

3. In a device of the class described, an inclined track, a dump truck movable along the track, an endless cable extending between pulleys spaced along the track, a projection on said cable adapted to engage part of the truck to move it up along the track, said projection disengaging from the truck when it reaches the upper pulley whereby the truck may return down the track by gravity, means for dumping the truck just before the truck is thus released, a receiver for material dumped from the truck, a chute sloping down from the receiver to a point over the starting position of the truck, and adapted to discharge the material into the truck as the material reaches the lower end of the chute.

4. In a device of the class described, spaced frame pedestals, an inclined track disposed therebetween, a material receiver at the upper end of the track, a chute extending downwardly from said receiver to a point over the other lower end of the track, the bottom of the receiver sloping toward said chute, said chute at its other end having a discharge opening, a dump truck movable along said track, a pulley on the track at its lower end, a second pulley on the track near its upper end, a handle connected to one of said pulleys, an endless cable extending over said pulleys, a projection on said cable adapted to engage a part of the truck to move it up the track, a dump body on said truck, a dependent dump arm on said body, a trip element on the track at its upper end, the projection being disengaged from the truck as it passes around the upper pulley, the arm engaging the trip element just before the projection disengages whereby the truck is dumped just before it is released to return by gravity to the starting point, the dumped material flowing by gravity down the chute and dropping into the truck body again, the mere continuous turning of the handle permitting the sequential repetition of the same series of events.

GEORGE WALKER KREBS.

REFERENCES CITED

The following references are of record in the file of this patent:

UNITED STATES PATENTS

| Number | Name | Date |
|---|---|---|
| 690,814 | Acklin | Jan. 7, 1902 |
| 692,496 | Acklin | Feb. 4, 1902 |
| 1,258,845 | Wilkins | Mar. 12, 1918 |
| 2,438,603 | Erhardt | Mar. 30, 1948 |